United States Patent
Kim et al.

(10) Patent No.: US 11,670,791 B2
(45) Date of Patent: Jun. 6, 2023

(54) POLYARYLENE ETHER-BASED POLYMER CONTAINING ALIPHATIC CHAIN, ELECTROLYTE MEMBRANE INCLUDING THE SAME, AND MEMBRANE-ELECTRODE ASSEMBLY INCLUDING THE ELECTROLYTE MEMBRANE

(71) Applicant: KOREA INSTITUTE OF SCIENCE AND TECHNOLOGY, Seoul (KR)

(72) Inventors: Hyoung-Juhn Kim, Seoul (KR); Jieun Choi, Seoul (KR); So Young Lee, Seoul (KR); Hee-Young Park, Seoul (KR); Sung Jong Yoo, Seoul (KR); Hyun Seo Park, Seoul (KR); Jing Young Kim, Seoul (KR); Jong Hyun Jang, Seoul (KR); Bora Seo, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 222 days.

(21) Appl. No.: 17/097,658

(22) Filed: Nov. 13, 2020

(65) Prior Publication Data
US 2022/0045346 A1  Feb. 10, 2022

(30) Foreign Application Priority Data
Aug. 5, 2020 (KR) .................. 10-2020-0097827

(51) Int. Cl.
*H01M 8/1032* (2016.01)
*C08G 65/40* (2006.01)
(Continued)

(52) U.S. Cl.
CPC .......... *H01M 8/1032* (2013.01); *C08G 65/40* (2013.01); *H01M 8/1004* (2013.01);
(Continued)

(58) Field of Classification Search
None
See application file for complete search history.

(56) References Cited

FOREIGN PATENT DOCUMENTS

| KR | 101275155 B1 | 6/2013 |
| KR | 101756343 B1 | 7/2017 |
| KR | 1020170079591 A | 7/2017 |

OTHER PUBLICATIONS

Baolin Zhao et al., "A novel strategy for constructing a highly conductive and swelling-resistant semi-flexible aromatic polymer based anion exchange membranes". Publication Date: Feb. 25, 2017.

*Primary Examiner* — Daniel S Gatewood
(74) *Attorney, Agent, or Firm* — Rabin & Berdo, P.C.

(57) ABSTRACT

The present disclosure relates to a polyarylene ether-based polymer for an electrolyte membrane of a fuel cell, represented by the following Chemical Formula 1. When the polyarylene ether-based polymer for an electrolyte membrane of a fuel cell is applied to the manufacture of a membrane-electrode assembly through a decal process, the hot pressing temperature may be controlled to about 120° C. so as to conform to a low glass transition temperature. Therefore, it is possible to solve the problems of deterioration of an electrolyte membrane or incomplete transfer of an electrode catalyst layer, caused by the high hot pressing temperature applied in the case of the conventional hydrocarbon-based polymer material.

[Chemical Formula 1]

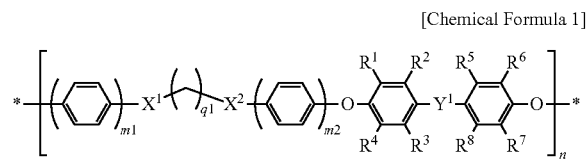

12 Claims, 5 Drawing Sheets

(51) Int. Cl.
 *H01M 8/1027* (2016.01)
 *H01M 8/1004* (2016.01)
 *H01M 8/10* (2016.01)
(52) U.S. Cl.
 CPC .. *H01M 8/1027* (2013.01); *H01M 2008/1095* (2013.01); *H01M 2300/0082* (2013.01)

[TOP]

[BOTTOM]

POLYARYLENE ETHER-BASED POLYMER CONTAINING ALIPHATIC CHAIN, ELECTROLYTE MEMBRANE INCLUDING THE SAME, AND MEMBRANE-ELECTRODE ASSEMBLY INCLUDING THE ELECTROLYTE MEMBRANE

CROSS-REFERENCE TO RELATED APPLICATIONS

This application claims, under 35 U.S.C. § 119, the priority of Korean Patent Application No. 10-2020-0097827 filed on Aug. 5, 2020 in the Korean Intellectual Property Office, the disclosure of which is incorporated herein by reference in its entirety.

TECHNICAL FIELD

The following disclosure relates to a polyarylene ether-based polymer containing an aliphatic chain, an electrolyte membrane including the same, a membrane-electrode assembly including the electrolyte membrane, and methods for the manufacture thereof. Particularly, the present disclosure relates to a polyarylene ether-based polymer having a low glass transition temperature suitable for the manufacture pf a membrane-electrode assembly for a polymer electrolyte fuel cell through a decal process, an electrolyte membrane including the same, a membrane-electrode assembly including the electrolyte membrane, and methods for the manufacture thereof.

BACKGROUND

Methods for manufacturing membrane-electrode assemblies for fuel cells are broadly classified into the two types of a method for applying a catalyst slurry composition onto a membrane (catalyst coated membrane, CCM) and a method for applying a catalyst slurry composition onto a substrate (catalyst coated substrate, CCS). Among them, the CCM method includes applying a catalyst layer directly onto an electrolyte membrane so that excellent interfacial properties may be realized. However, the CCM method is disadvantageous in that the membrane may be deformed with ease by the solvent in the slurry during the application of the catalyst slurry onto the membrane, the slurry composition may be changed with ease, a uniform catalyst layer may not be formed, and a continuous process may not be applied. It is known that a decal process is a typical method which can solve the above-mentioned problems. The decal process is a method for manufacturing a membrane-electrode assembly providing excellent interfacial properties and amenable to a continuous process, and has an advantage particularly in terms of mass productivity. Therefore, many studies related with the decal process, including constitution of a catalyst slurry solvent, catalyst dispersion methods and catalyst coating drying conditions, have been conducted.

Meanwhile, most of such decal process-related studies have been conducted about hydrogen fluoride-based Nafion polymer electrolyte membranes available from Dupont Inc. and having a relatively low glass transition temperature. Thus, transfer of a catalyst layer has been carried out under a hot pressing condition with a relatively low temperature of about 120° C. General hydrocarbon-based membranes having higher cost efficiency as compared to hydrogen fluoride-based membranes, such as Nafion polymer electrolyte membranes, have a glass transition temperature of 200° C. or higher. Accordingly, the electrolyte membranes may be deteriorated with ease undesirably under a high-temperature hot pressing condition conformed to such a glass transition temperature. As a result, there is a need for a method for transferring a catalyst layer at a low temperature in a hydrocarbon-based electrolyte layer.

REFERENCES

Patent Documents

Korean Patent Publication No. 10-2012-0126302

SUMMARY

The present disclosure is designed to solve the problems of deterioration and incomplete release of an electrolyte membrane occurring in the conventional decal process of the related art due to such a high glass transition temperature of about 200° C. of a hydrocarbon-based polymer material. An embodiment of the present disclosure is directed to providing a polyarylene ether-based polymer for an electrolyte membrane of a fuel cell, containing an aliphatic chain so that a catalyst layer may be transferred even at a low hot pressing temperature, in order to reduce the glass transition temperature of the polymer forming a hydrocarbon-based electrolyte membrane. The present disclosure is also directed to providing a method for preparing the polyarylene ether-based polymer.

Another embodiment of the present disclosure is to providing an electrolyte membrane including a polyarylene ether-based polymer containing an aliphatic chain and having a low glass transition temperature so that a catalyst layer may be transferred with ease at a hot pressing temperature, and a method for manufacturing the same.

Still another embodiment of the present disclosure is to providing a membrane-electrode assembly using an electrolyte membrane including a polyarylene ether-based polymer containing an aliphatic chain and having a low glass transition temperature so that a catalyst layer may be transferred with ease at a hot pressing temperature, and a method for manufacturing the same.

Yet another embodiment of the present disclosure is to providing a fuel cell including the membrane-electrode assembly and a method for manufacturing the same.

In one aspect of the present disclosure, there is provided a polyarylene ether-based polymer for an electrolyte membrane of a fuel cell, represented by the following Chemical Formula 1:

[Chemical Formula 1]

wherein $X^1$ and $X^2$ are the same or different from each other, and each independently represents a valence bond, oxygen atom or a sulfur atom;

$Y^1$ represents a sulfonyl group (—$SO_2$—) or carbonyl group (—CO—);

$R^1$ to $R^8$ are the same or different from one another, and each independently represents a hydrogen atom, C1-C10 alkyl group or a sulfonic acid group (—$SO_3H$);

each of m1 and m2 represents the number of repeating units and is an integer of 1-3;

q1 is the number of repeating units and is an integer of 2-30; and n represents the number of repeating units.

Particularly, in Chemical Formula 1, $X^1$ and $X^2$ are the same or different from each other, and each independently represents a valence bond or oxygen atom;

$Y^1$ represents a sulfonyl group (—$SO_2$—);

$R^1$ to $R^8$ are the same or different from one another, and each independently represents a hydrogen atom, C1-C4 alkyl group or a sulfonic acid group (—$SO_3H$);

each of m1 and m2 is 1;

q1 is the number of repeating units and is an integer of 3-20; and n represents the number of repeating units.

More particularly, each of $X^1$ and $X^2$ represents an oxygen atom;

$Y^1$ represents a sulfonyl group (—$SO_2$—);

$R^1$ to $R^8$ are the same or different from one another, and each independently represents a hydrogen atom, methyl group or a sulfonic acid group (—$SO_3H$), with the proviso that three or more sulfonic acid groups (—$SO_3H$) cannot be present;

each of m1 and m2 is 1;

q1 is the number of repeating units and is an integer of 4-10; and n represents the number of repeating units.

Even more particularly, the polyarylene ether-based polymer may be represented by the following Chemical Formula 2:

[Chemical Formula 2]

In Chemical Formula 2, each of x and (100−x) represents the ratio of repeating units based on the total number of repeating units taken as 100; and x represents an integer of 20-40.

The polyarylene ether-based polymer represented by Chemical Formula 1 may have a number average molecular weight ($M_n$) of 10,000-200,000 g/mol.

The polyarylene ether-based polymer represented by Chemical Formula 1 may have units in which at least one selected from $R^1$ to $R^8$ represents a sulfonic acid group at a ratio of 20-50% based on the total number (n) of units.

The polyarylene ether-based polymer may show peaks at 1.35-1.57, 1.57-1.88 and 3.87-4.08 ppm due to an aliphatic chain as analyzed by $^1$H-NMR.

The polyarylene ether-based polymer represented by Chemical Formula 1 may have a glass transition temperature ($T_g$) of 70-130° C.

In another aspect of the present disclosure, there is provided an electrolyte membrane for a fuel cell, including the polyarylene ether-based polymer.

In still another aspect of the present disclosure, there is provided a membrane-electrode assembly for a fuel cell, including the electrolyte membrane for a fuel cell.

The membrane-electrode assembly may include catalyst layers bound to the top and bottom of the electrolyte membrane.

In still another aspect of the present disclosure, there is provided a polymer electrolyte fuel cell including the membrane-electrode assembly.

In still another aspect of the present disclosure, there is provided a method for preparing a polyarylene ether-based polymer for an electrolyte membrane of a fuel cell, including the steps of:

(1) preparing a compound represented by the following Chemical Formula 3 and a compound represented by the following Chemical Formula 4 as monomers;

(2) mixing the monomers, a base, a polymerization solvent and an organic solvent to form a mixture;

(3) carrying out azeotropic dehydration of the mixture to remove the organic solvent and to polymerize a polyarylene ether-based polymer; and (4) precipitating the polyarylene ether-based polymer in an aqueous alcohol solution, followed by washing and drying, to obtain the polyarylene ether-based polymer.

[Chemical Formula 3]

wherein $X^1$ and $X^2$ are the same or different from each other, and each independently represents a valence bond, oxygen atom or a sulfur atom;

each of m1 and m2 represents the number of repeating units and is an integer of 1-3; and q1 is the number of repeating units and is an integer of 2-30.

[Chemical Formula 4]

Wherein $Y^1$ represents a sulfonyl group or ester group;

$R^1$ to $R^8$ are the same or different from one another, and each independently represents a hydrogen atom, C1-C10 alkyl group, $-SO_3Li$, $-SO_3Na$ or $-SO_3K$; and each of $Z^1$ and $Z^2$ represents a halogen group.

Particularly, in Chemical Formula 3, $X^1$ and $X^2$ are the same or different from each other, and each independently represents a valence bond or oxygen atom;

each of m1 and m2 is 1; and q1 is the number of repeating units and is an integer of 3-20, and in Chemical Formula 4, $Y^1$ represents a sulfonyl group ($-SO_2-$);

$R^1$ to $R^8$ are the same or different from one another, and each independently represents a hydrogen atom, C1-C4 alkyl group or $-SO_3Na$; and each of $Z^1$ and $Z^2$ may represent a fluoro group or chloro group.

More particularly, the compound represented by Chemical formula 3 may be a compound represented by the following Chemical Formula A, and the compound represented by Chemical Formula 4 may be a compound represented by the following Chemical Formula B or a compound represented by the following Chemical Formula C.

[Chemical Formula A]

[Chemical Formula B]

[Chemical Formula C]

In the case of the monomer, i.e. the compound represented by Chemical Formula 4, the monomer represented by Chemical Formula C may be used in an amount of 20-50 mol % based on the total number of mols of the monomer represented by Chemical Formula B and the monomer represented by Chemical Formula C.

In still another aspect of the present disclosure, there is provided a method for manufacturing an electrolyte membrane for a fuel cell, including the steps of:

forming the polyarylene ether-based polymer prepared as described above into a film having a predetermined thickness; and allowing the film to react with a strong acid solution to convert the counter ion of $-SO_3Li$, $-SO_3Na$ or $-SO_3K$ into proton.

In still another aspect of the present disclosure, there is provided a method for manufacturing a membrane-electrode assembly for a fuel cell, including the steps of:

(a) preparing a catalyst slurry containing an electrode catalyst, distilled water and a solvent;

(b) coating the catalyst slurry onto a substrate for transfer to prepare a catalyst slurry-coated substrate for transfer; and (c) forming a membrane-electrode assembly through a decal process by using the electrolyte membrane as defined above and the catalyst slurry-coated substrate for transfer.

The decal process in step (c) may be carried out by cutting the catalyst slurry-coated substrate for transfer into a predetermined electrode size, and interposing the electrolyte membrane between two catalyst slurry-coated substrates for transfer cut as mentioned above in such a manner that the catalyst slurry may be in contact with the electrolyte membrane, and carrying out hot pressing.

The hot pressing may be carried out at 100-130° C.

The hot pressing may be carried out under a pressure of 80-120 $kgf/cm^2$.

The hot pressing may be carried out by applying pressure for 1-10 minutes.

In yet another aspect of the present disclosure, there is provided a method for manufacturing a fuel cell including the method for manufacturing a membrane-electrode assembly.

The polyarylene ether-based polymer for an electrolyte membrane of a fuel cell according to an embodiment of the present disclosure includes an aliphatic chain and thus has a low glass transition temperature of about 120° C., while the conventional hydrocarbon-based polymer material has a significantly high glass transition temperature of about 200° C. Therefore, when the polyarylene ether-based polymer for an electrolyte membrane of a fuel cell according to an embodiment of the present disclosure is applied to the manufacture of a membrane-electrode assembly through a decal process, the hot pressing temperature may be controlled to about 120° C. so as to conform to such a low glass transition temperature. As a result, it is possible to solve the problems of deterioration of an electrolyte membrane or incomplete transfer of an electrode catalyst layer, caused by the high hot pressing temperature applied in the case of the conventional hydrocarbon-based polymer material.

As a result, when forming the polyarylene ether-based polymer for an electrolyte membrane of a fuel cell according to an embodiment of the present disclosure into an electrolyte membrane, it is possible to obtain a membrane-electrode assembly with an electrode catalyst layer transfer ratio of 90% or higher even at a low hot pressing temperature during the process for manufacturing a membrane-electrode assembly using the electrolyte membrane. In addition, the polyarylene ether-based polymer can substitute for the conventional expensive hydrogen fluoride-based polymer to provide high cost-efficiency.

DETAILED DESCRIPTION OF EMBODIMENTS

Hereinafter, preferred embodiments of the present disclosure will be described in detail with reference to the accompanying drawings, in which exemplary embodiments are shown, since various changes and modifications may be made within the scope of the present disclosure. However, it should be understood that the following exemplary embodiments are not intended to limit the scope of the present disclosure but cover any modifications, equivalents and substitutions without departing from the spirit and scope of the present disclosure. In the description, details of well-known features and techniques may be omitted to avoid unnecessarily obscuring the presented embodiments.

Hereinafter, the polyarylene ether-based polymer for an electrolyte membrane of a fuel cell according to an embodiment of the present disclosure will be explained in more detail.

The polyarylene ether-based polymer for an electrolyte membrane of a fuel cell according to an embodiment of the present disclosure is represented by the following Chemical Formula 1.

[Chemical Formula 1]

wherein $X^1$ and $X^2$ are the same or different from each other, and each independently represents a valence bond, oxygen atom or a sulfur atom;

$Y^1$ represents a sulfonyl group ($-SO_2-$) or carbonyl group ($-CO-$);

$R^1$ to $R^8$ are the same or different from one another, and each independently represents a hydrogen atom, C1-C10 alkyl group or a sulfonic acid group ($-SO_3H$);

each of m1 and m2 represents the number of repeating units and is an integer of 1-3;

q1 is the number of repeating units and is an integer of 2-30; and n represents the number of repeating units.

Particularly, in Chemical Formula 1, $X^1$ and $X^2$ are the same or different from each other, and each independently represents a valence bond or oxygen atom;

$Y^1$ represents a sulfonyl group ($-SO_2-$);

$R^1$ to $R^8$ are the same or different from one another, and each independently represents a hydrogen atom, C1-C4 alkyl group or a sulfonic acid group ($-SO_3H$);

each of m1 and m2 is 1;

q1 is the number of repeating units and is an integer of 3-20; and n represents the number of repeating units.

More particularly, each of $X^1$ and $X^2$ represents an oxygen atom;

$Y^1$ represents a sulfonyl group ($-SO_2-$);

$R^1$ to $R^8$ are the same or different from one another, and each independently represents a hydrogen atom, methyl group or a sulfonic acid group ($-SO_3H$), with the proviso that three or more sulfonic acid groups ($-SO_3H$) cannot be present;

each of m1 and m2 is 1;

q1 is the number of repeating units and is an integer of 4-10; and n represents the number of repeating units.

Even more particularly, the polyarylene ether-based polymer may be represented by the following Chemical Formula 2:

[Chemical Formula 2]

In Chemical Formula 2, each of x and (100−x) represents the ratio of repeating units based on the total number of repeating units taken as 100; and x represents an integer of 20-40.

The polyarylene ether-based polymer represented by Chemical Formula 1 may have a number average molecular weight ($M_e$) of 10,000-200,000 g/mol, particularly 30,000-100,000 g/mol.

The polyarylene ether-based polymer represented by Chemical Formula 1 may have units in which at least one selected from $R^1$ to $R^8$ represents a sulfonic acid group at a ratio of 20-50%, particularly 25-35%, based on the total number (n) of units. When the units in which at least one selected from $R^1$ to $R^8$ represents a sulfonic acid group are present at a ratio of less than 20%, the polymer may have low ion conductivity. When the units in which at least one selected from $R^1$ to $R^8$ represents a sulfonic acid group are present at a ratio of more than 50%, the polymer may have an increased water swelling ratio.

The polyarylene ether-based polymer is characterized in that it shows peaks at 1.35-1.57, 1.57-1.88 and 3.87-4.08 ppm due to an aliphatic chain as analyzed by $^1$H-NMR.

The polyarylene ether-based polymer represented by Chemical Formula 1 may have a glass transition temperature ($T_g$) of 70-130° C., particularly 75-120° C., and more particularly 90-110° C. When the glass transition temperature is lower than 70° C., the electrolyte containing the polyarylene ether-based polymer may have low durability. When the glass transition temperature is higher than 130° C., transfer of an electrode catalyst layer may be accomplished incompletely during the manufacture of a membrane-electrode assembly based on hot pressing.

In another aspect of the present disclosure, there is provided an electrolyte membrane for a fuel cell, including the polyarylene ether-based polymer.

In still another aspect of the present disclosure, there is provided a membrane-electrode assembly for a fuel cell, including the electrolyte membrane for a fuel cell.

The membrane-electrode assembly may include catalyst layers bound to the top and bottom of the electrolyte membrane.

The catalyst contained in the catalyst layers may be a platinum-based catalyst.

In still another aspect of the present disclosure, there is provided a polymer electrolyte fuel cell including the membrane-electrode assembly.

Hereinafter, the method for preparing the polyarylene ether-based polymer for an electrolyte membrane of a fuel cell according to an embodiment of the present disclosure will be explained.

First, a compound represented by the following Chemical Formula 3 and a compound represented by the following Chemical Formula 4 are prepared as monomers (step 1).

[Chemical Formula 3]

wherein $X^1$ and $X^2$ are the same or different from each other, and each independently represents a valence bond, oxygen atom or a sulfur atom;

each of m1 and m2 represents the number of repeating units and is an integer of 1-3; and q1 is the number of repeating units and is an integer of 2-30.

[Chemical Formula 4]

wherein $Y^1$ represents a sulfonyl group or ester group;

$R^1$ to $R^8$ are the same or different from one another, and each independently represents a hydrogen atom, C1-C10 alkyl group, —SO$_3$Li, —SO$_3$Na or —SO$_3$K; and each of $Z^1$ and $Z^2$ represents a halogen group.

Particularly, in Chemical Formula 3, $X^1$ and $X^2$ are the same or different from each other, and each independently represents a valence bond or oxygen atom;

each of m1 and m2 is 1; and q1 is the number of repeating units and is an integer of 3-20, and in Chemical Formula 4, $Y^1$ represents a sulfonyl group (—SO$_2$—);

$R^1$ to $R^8$ are the same or different from one another, and each independently represents a hydrogen atom, C1-C4 alkyl group or —SO$_3$Na; and each of $Z^1$ and $Z^2$ may represent a fluoro group or chloro group.

More particularly, the compound represented by Chemical formula 3 may be a compound represented by the following Chemical Formula A, and the compound represented by Chemical Formula 4 may be a compound represented by the following Chemical Formula B or a compound represented by the following Chemical Formula C.

[Chemical Formula A]

[Chemical Formula B]

[Chemical Formula C]

In the case of the monomer, i.e. the compound represented by Chemical Formula 4, the monomer represented by Chemical Formula C may be used in an amount of 20-40 mol %, particularly 25-35 mol %, based on the total number of mols of the monomer represented by Chemical Formula B and the monomer represented by Chemical Formula C.

Next, the monomers, a base, a polymerization solvent and an organic solvent are mixed to form a mixture (step 2).

The polymerization solvent is one used for polycondensation and may be any one selected from N-methyl pyrrolidone, dimethyl sulfoxide and dimethyl acetamide.

Also, the base is one used for polycondensation and may be calcium carbonate. Herein, calcium carbonate causes formation of phenoxide of the phenol group of diphenol so that the phenoxide may function as a nucleophile, and allows the fluorine with a sulfone group located at the para-position in 4,4'-difluorodiphenyl sulfone to be leaved more easily so that polymerization may be carried out.

The organic solvent may be toluene, benzene, chlorobenzene, or the like.

Then, azeotropic dehydration of the mixture is carried out to remove the organic solvent and to polymerize a polyarylene ether-based polymer (step 3).

After the azeotropic dehydration is carried out at 130-150° C. for 4-6 hours, the organic solvent is removed and the mixture is warmed to 150-180° C. and allowed to stand for 12-24 hours to carry out polymerization.

Finally, the polyarylene ether-based polymer is precipitated in an aqueous alcohol solution, followed by washing and drying, to obtain the polyarylene ether-based polymer (step 4).

The polyarylene ether-based polymer may be precipitated in a mixed solution containing isopropanol and distilled water and washed with isopropanol and distilled water, and the resultant product may be introduced to a vacuum oven and dried at 60-100° C. In this manner, the polyarylene ether-based polymer having an aliphatic chain may be obtained.

Hereinafter, the method for manufacturing the electrolyte membrane for a fuel cell according to an embodiment of the present disclosure will be explained.

First, the polyarylene ether-based polymer prepared as described above is formed into a film having a predetermined thickness.

Particularly, the polyarylene ether-based polymer is dissolved in an organic solvent at 2-10 wt % to provide a polymer solution.

The organic solvent may include N-methyl pyrrolidone, dimethyl sulfoxide, dimethyl acetamide or a mixture thereof.

The polymer solution may be filtered, loaded on a petri dish and vacuum-dried at 80-100° C. for 36-48 hours to form the polymer into a film shape.

Next, the film is allowed to react with a strong acid solution to convert the counter ion of $-SO_3Li$, $-SO_3Na$ or $-SO_3K$ into proton.

To convert the counter ion into proton, the film may be dipped in 1M aqueous sulfuric acid solution at 60-100° C. for 6-10 hours, and then washed with distilled water.

Hereinafter, the method for manufacturing the membrane-electrode assembly for a fuel cell according to an embodiment of the present disclosure will be explained.

First, a catalyst slurry containing an electrode catalyst, distilled water and a solvent is prepared (step a).

The electrode catalyst may be a platinum-based metal.

The solvent may include isopropyl alcohol, toluene, ethanol, n-propanol, n-butyl acetate, ethylene glycol, butyl carbitol (BC), butyl carbitol acetate (BCA), or the like, but is not limited thereto.

Next, the catalyst slurry is coated onto a substrate for transfer to prepare a catalyst slurry-coated substrate for transfer (step b).

The substrate for transfer may be a polyimide film.

Herein, the coating may be carried out through doctor blade coating, slot die coating, bar coating, comma coating, or the like, but is not limited thereto.

Finally, a membrane-electrode assembly is obtained through a decal process by using the electrolyte membrane and the catalyst slurry-coated substrate for transfer (step c).

The decal process may be carried out by cutting the catalyst slurry-coated substrate for transfer into a predetermined electrode size, and interposing the electrolyte membrane between two catalyst slurry-coated substrates for transfer cut as mentioned above in such a manner that the catalyst slurry may be in contact with the electrolyte membrane, and carrying out hot pressing.

The hot pressing may be carried out at 100-130° C., particularly 110-125° C. When the hot pressing temperature is lower than 100° C., the transfer ratio may be decreased. When the hot pressing temperature is higher than 130° C., the electrolyte membrane may be deteriorated.

The hot pressing may be carried out under a pressure of 80-120 kgf/cm$^2$ for 1-10 minutes, particularly under a pressure of 90-110 kgf/cm$^2$ for 3-7 minutes, and more particularly under a pressure of 95-105 kgf/cm$^2$ for 4-6 minutes. When the hot pressing is carried out under the condition of a pressure of less than 80 kgf/cm$^2$ and less than 1 minute, the transfer ratio of a catalyst layer may be decreased. When the hot pressing is carried out under the condition of a pressure of more than 120 kgf/cm$^2$ and more than 10 minutes, the electrolyte membrane may be damaged.

In yet another aspect of the present disclosure, there is provided a method for manufacturing a fuel cell including the method for manufacturing a membrane-electrode assembly.

The examples and experiments will now be described. The following examples and experiments are for illustrative purposes only and not intended to limit the scope of this disclosure. It will be apparent to those skilled in the art that various changes and modifications may be made without departing from the spirit and scope of the disclosure as defined in the following claims.

EXAMPLES

Example 1: Synthesis of Polyarylene-Based Polymer Containing Aliphatic Chain for Electrolyte Membrane First, a mechanical stirrer, Dean-Stark trap and a condenser were connected to a four-neck 100 mL round-bottom flask, and then 1.5 g (5 mmol) of 4,4'-dihydroxy 1,6-diphenoxyhexane (Chemical Formula A), 0.9 g (3.5 mmol) of 4,4'-difluorodiphenylsulfone (Chemical Formula B), 0.7 g (1.5 mmol) of disodium bis(4-fluoro-3-sulfophenyl)sulfone (Chemical Formula C) and 2.1 g (15 mmol) of calcium carbonate were introduced thereto and dissolved in 17.3 mL of N-methyl pyrrolidone and 8.6 mL of toluene under argon gas atmosphere. Then, azeotropic dehydration was carried out at 140° C. for 4 hours. During the azeotropic dehydration, water in the flask boiled with toluene and escaped therefrom through the Dean-Stark trap, while toluene having a smaller density as compared to water was present in the upper layer of the trap and continuously circulated. After that, toluene was removed, and the reaction mixture was warmed to 170° C. and allowed to stand for 20 hours to carry out polymerization. The resultant product was precipitated in a mixed solution of isopropanol with distilled water, washed with isopropanol and distilled water, and then introduced to a vacuum oven to carry out drying at 80° C. (yield: 97%).

[Chemical Formula A]

[Chemical Formula B]

[Chemical Formula C]

Example 2: Manufacture of Electrolyte Membrane

The polymer obtained according to Example 1 was dissolved in N-methyl pyrrolidone at 5 wt % to prepare a polymer solution. The polymer solution was filtered, loaded on a Petri dish and vacuum dried at 90° C. for 40 hours to obtain a film having a thickness of 30 μm.

To exchange the counter ion, i.e. sodium ion, in the film with proton, the film was dipped in 1M sulfuric acid solution at 60° C. for 6 hours and washed with distilled water to obtain a polyarylene ether sulfone electrolyte membrane containing an aliphatic chain.

Example 3: Manufacture of Membrane-Electrode Assembly

To prepare an electrode slurry, 1 g of 40 wt % Pt/C catalyst (JM) was introduced to a vial, and 1.2 g of distilled water, 8 g of 5 wt % ionomer dispersed solution (Nafion, Dupont Inc.) and 1.2 g of isopropyl alcohol were added thereto, while carrying out purging with nitrogen for 15 minutes. After the nitrogen purging was stopped and the vial was closed with a cover, the reaction mixture was agitated for 30 minutes. Then, the reaction mixture was homogenized with a homogenizer at 20 kHz for 5 minutes and agitated for 24 hours to obtain a catalyst slurry.

The resultant catalyst slurry was applied onto a polyimide film (Capton, Dupont Inc.) and coated thereon with a doctor blade to a coating amount of 0.4 mg/cm$^2$ of platinum catalyst per unit area, followed by fixing for 30 minutes.

Then, the catalyst layer coated on the polyimide film was cut into a size of 25 cm$^2$, and two catalyst layer-coated polyimide films were stacked with the electrolyte membrane obtained according to Example 2 in such a manner that the catalyst layers might face each other with the electrolyte membrane interposed therebetween. After that, a transfer sheet was attached to the outside of the resultant structure. Then, pressing was carried out by using a vacuum press at 120° C. under a pressure of 100 kgf/cm$^2$ for 5 minutes to obtain a membrane-electrode assembly through a decal process. The polyimide films were removed from the resultant membrane-electrode assembly and the transfer ratio was determined from the weight of the catalyst layers remaining on the films.

Comparative Example 1: Synthesis of Polyarylene Ether-Based Polymer Having No Aliphatic Chain To determine the effect of an aliphatic chain, a polyarylene ether-based polymer having no aliphatic chain and represented by the following [Chemical Formula 4] was prepared. Particularly, a polymer compound represented by the following [Chemical Formula 5] was prepared in the same manner as described in Example 1, except that a monomer represented by the following [Chemical Formula D] was used instead of the monomer represented by [Chemical Formula A] (yield: 98%).

[Chemical Formula D]

[Chemical Formula 5]

Comparative Example 2: Manufacture of Electrolyte Membrane

An electrolyte membrane was obtained in the same manner as described in Example 2, except that the polymer according to Comparative Example 1 was used instead of the polymer according to Example 1.

Comparative Example 3: Manufacture of Membrane-Electrode Assembly

A membrane-electrode assembly was obtained in the same manner as described in Example 3, except that the electrolyte membrane according to Comparative Example 2 was used instead of the electrolyte membrane according to Example 2.

TEST EXAMPLES

Test Example 1: $^1$H-NMR Analysis Results

Figure 1:
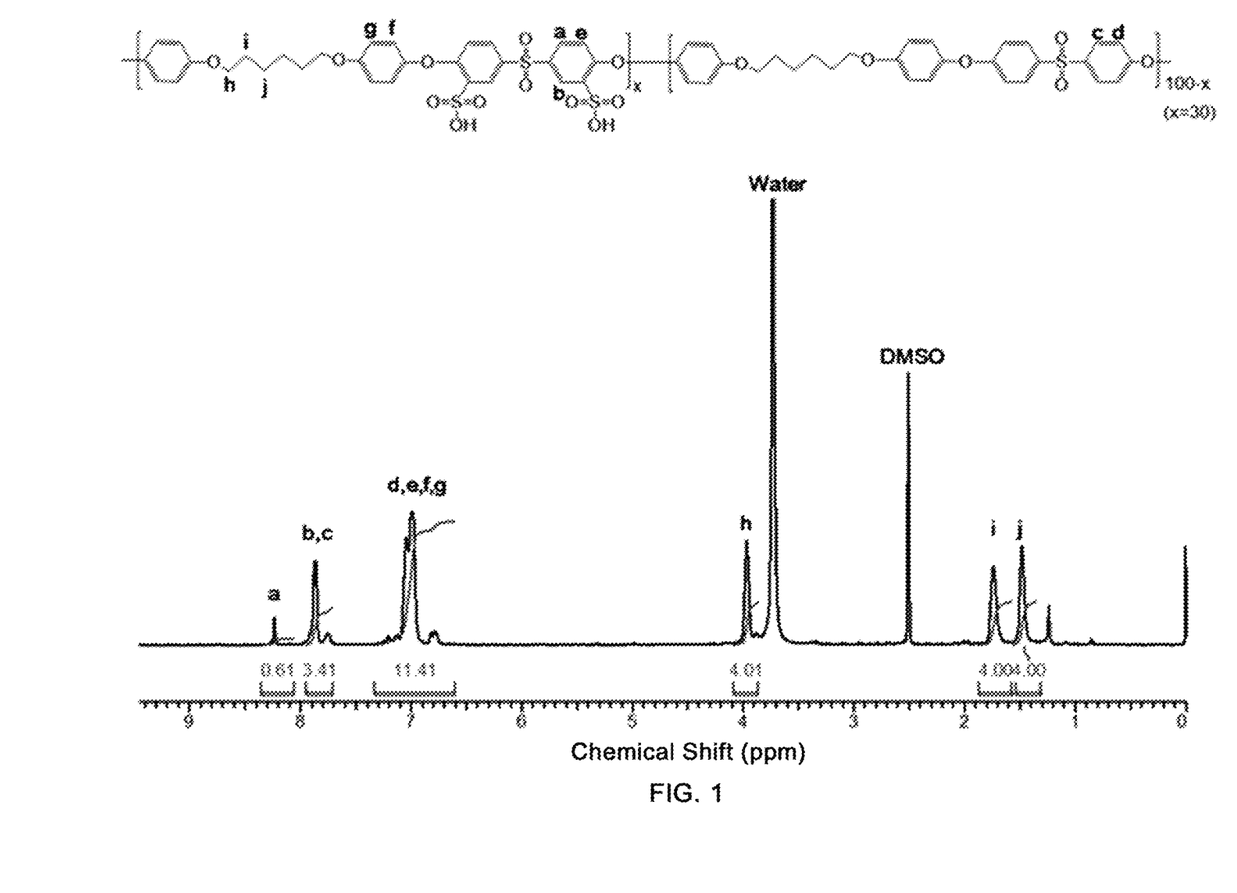
FIG. 1 shows the $^1$H-NMR spectrum of the polymer obtained according to Example 1.

FIG. 1 shows the $^1$H-NMR spectrum of the polymer containing an aliphatic chain, obtained according to Example 1. It can be seen that polyarylene ether sulfone containing an aliphatic chain was synthesized, as determined by the peaks derived from the hydrogen atoms of —CH$_2$— in the aliphatic chain at δ 1.35-1.57, 1.57-1.88 and 3.87-4.08 ppm and the peaks derived from the aromatic hydrogen atoms of benzene ring at δ 6.61-7.34, 7.72-7.95 and 8.06-8.36 ppm.

Figure 2:
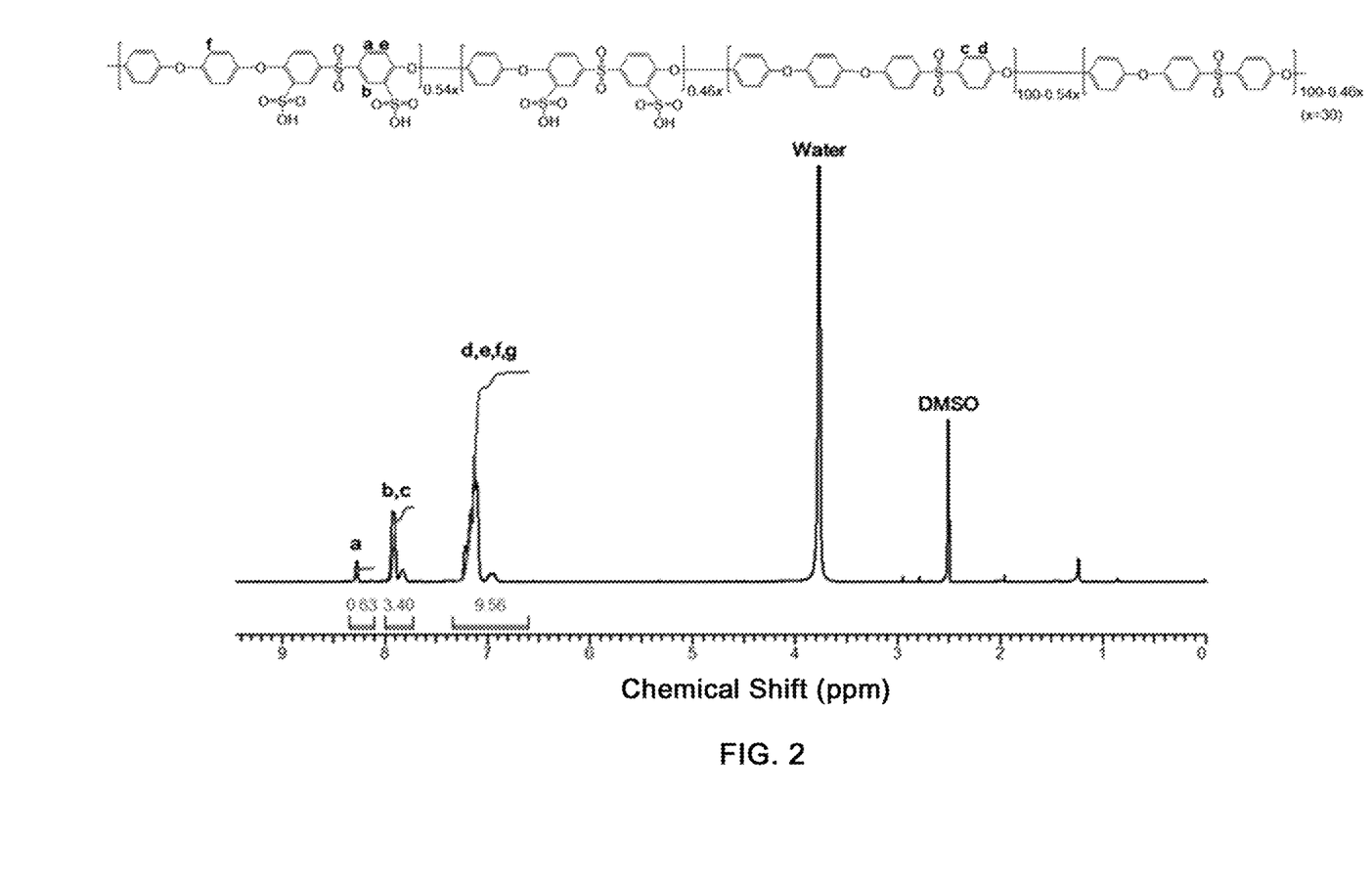
FIG. 2 shows the $^1$H-NMR spectrum of the polymer obtained according to Comparative Example 1.

FIG. 2 shows the $^1$H-NMR spectrum of the polymer having no aliphatic chain, obtained according to Comparative Example 1. It can be seen that polyarylene ether sulfone having no aliphatic chain was synthesized, as determined by the peaks derived from the aromatic hydrogen atoms of benzene ring at δ 6.60-7.34, 7.73-8.00 and 8.11-8.34 ppm.

Test Example 2: Glass Transition Temperature Analysis of Polymer

Figure 3A:
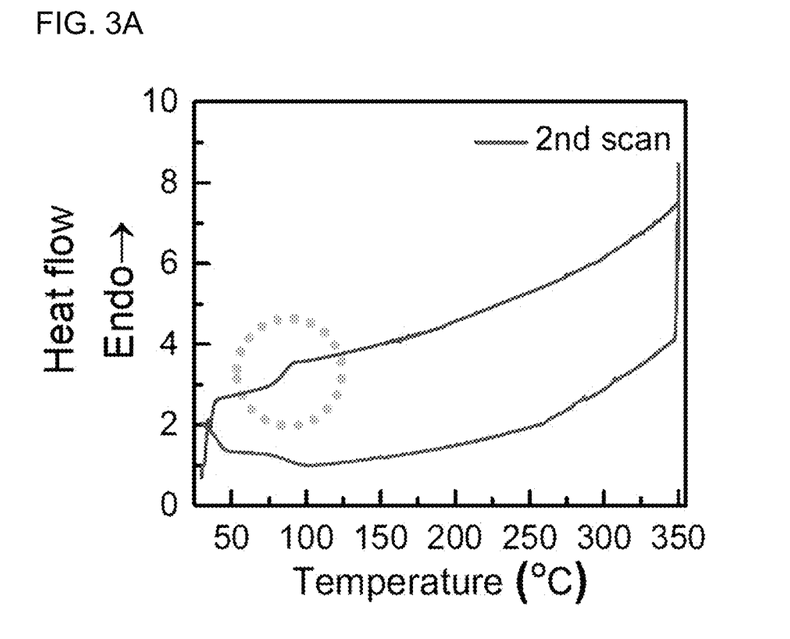
FIG. 3A and FIG. 3B show the result of differential scanning calorimetry of the polymer obtained according to Example 1.
Figure 3B:
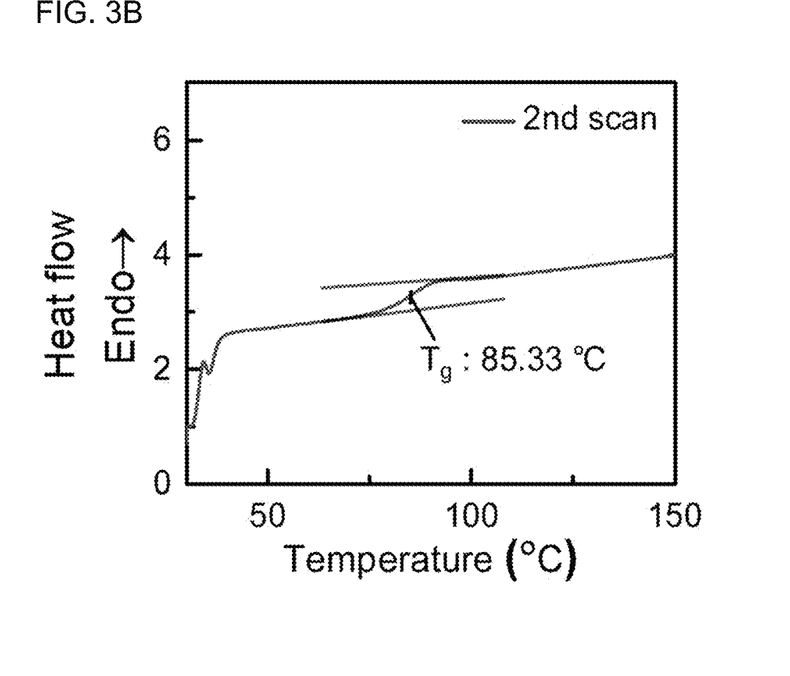
Figure 4A:
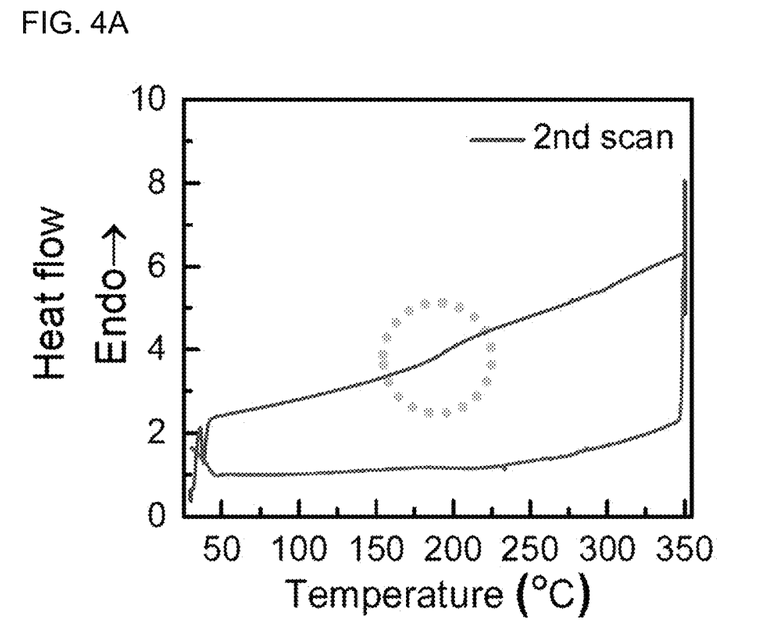
FIG. 4A and FIG. 4B show the result of differential scanning calorimetry of the polymer obtained according to Comparative Example 1.
Figure 4B:
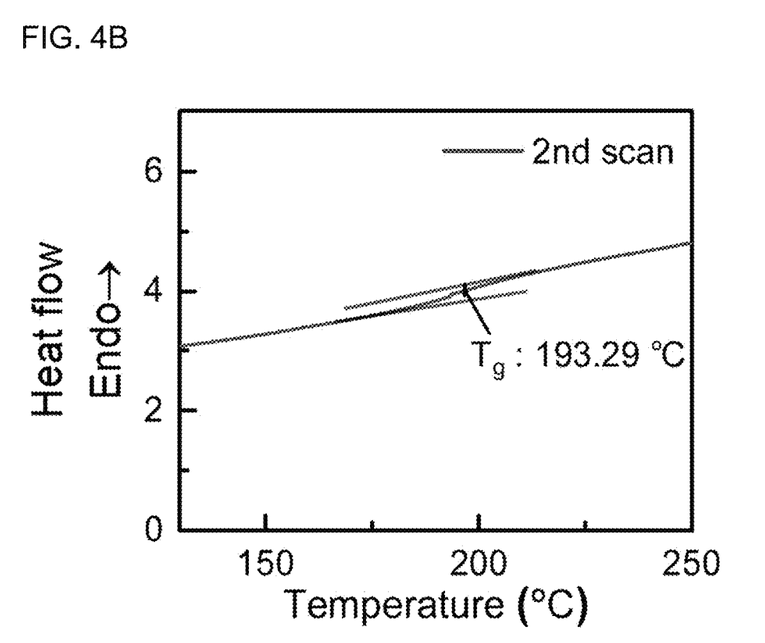

Differential scanning calorimetry was carried out to determine the glass transition temperature of the polymer obtained according to Example 1 or the polymer obtained according to Comparative Example 1. FIG. 3A and FIG. 3B show the result of differential scanning calorimetry of the polymer obtained according to Example 1. FIG. 4A and FIG. 4B show the result of differential scanning calorimetry of the polymer obtained according to Comparative Example 1.

It can be seen that the polyarylene ether sulfone containing an aliphatic chain according to Example 1 has a glass transition temperature of 85.33° C., while the polyarylene ether sulfone having no aliphatic chain according to Comparative Example 1 has a glass transition temperature of 193.29° C., which is higher than the glass transition temperature of Example 1 by 100° C. or more.

Test Example 3: Determination of Transfer Ratio of Catalyst Layer in Membrane-Electrode Assembly To compare the membrane-electrode assembly according to Example 3 with the membrane-electrode assembly according to Comparative Example 3 in terms of the transfer ratio of the catalyst layer to the electrolyte membrane, the polyimide film was removed from each membrane-electrode assembly and the weight of the catalyst layer remaining thereon was measured. The results are shown in the following Table 1 and the photograph of FIG. 5.

TABLE 1

| Position of Electrolyte Membrane | | Example | Comparative Example |
| --- | --- | --- | --- |
| Top | Weight before Transfer (g) | 0.2078 | 0.2077 |
| | Weight after Transfer (g) | 0.1873 | 0.2070 |
| | Weight of Pt per Unit Area (mg/cm$^2$) | 0.39 | 0.01 |
| Bottom | Weight before Transfer (g) | 0.2080 | 0.2095 |
| | Weight after Transfer (g) | 0.1874 | 0.2091 |
| | Weight of Pt per Unit Area (mg/cm$^2$) | 0.40 | 0.01 |

Figure 5:
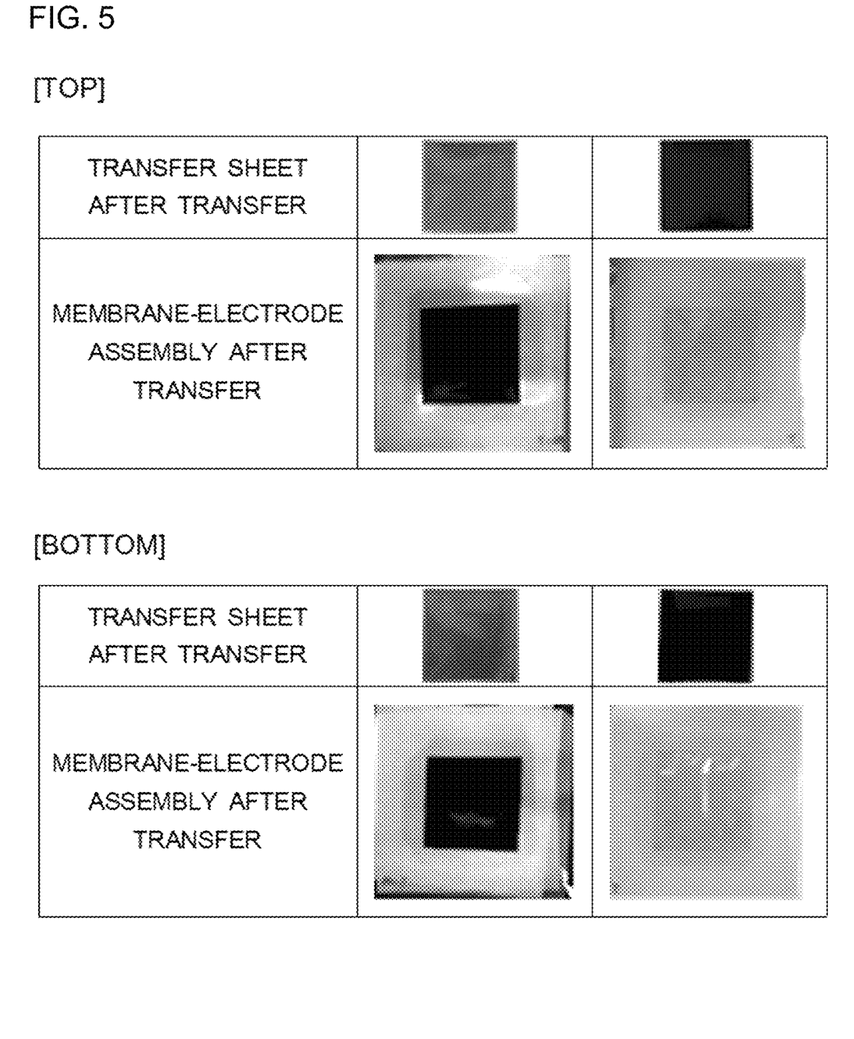
FIG. 5 is a photograph illustrating the catalyst layers transferred in the membrane-electrode assembly according to Test Example 3.

As can be seen from the above results, in the case of the membrane-electrode assembly according to Example 3, the transfer ratio calculated on the basis of the top polyimide film is about 97.5%, while the transfer ratio calculated on the basis of the bottom polyimide film is about 96.5%. On the contrary, in the case of the membrane-electrode assembly according to Comparative Example 3, the transfer ratio is about 2.5% both at the top and at the bottom, which suggests that substantially no transfer is accomplished. It is thought that this is because the catalyst layer is hardly transferred at a low temperature of 120° C. in the membrane-electrode assembly according to Comparative Example 3 due to a high glass transition of about 200° C. of the polyarylene ether sulfone having no aliphatic chain according to Comparative Example 1.

The present disclosure has been described in detail. However, it should be understood that various changes and modifications may be made through addition, change or elimination of constitutional elements within the scope of the present disclosure defined by the following claims. Therefore, such changes and modifications will become apparent to those skilled in the art and fall within the scope of the present disclosure.

What is claimed is:

1. A polyarylene ether-based polymer for an electrolyte membrane of a fuel cell, represented by the following Chemical Formula 1:

[Chemical Formula 1]

wherein $X^1$ and $X^2$ are the same or different from each other, and each independently represents a valence bond, oxygen atom or a sulfur atom;

$Y^1$ represents a sulfonyl group (—SO$_2$—) or carbonyl group (—CO—);

$R^1$ to $R^8$ are the same or different from one another, and each independently represents a hydrogen atom, C1-C10 alkyl group or a sulfonic acid group (—SO$_3$H);

each of m1 and m2 represents the number of repeating units and is an integer of 1-3;

q1 is the number of repeating units and is an integer of 2-30; and n represents the number of repeating units.

2. The polyarylene ether-based polymer for an electrolyte membrane of a fuel cell according to claim 1, wherein $X^1$ and $X^2$ are the same or different from each other, and each independently represents a valence bond or oxygen atom;

$Y^1$ represents a sulfonyl group (—$SO_2$—);

$R^1$ to $R^8$ are the same or different from one another, and each independently represents a hydrogen atom, C1-C4 alkyl group or a sulfonic acid group (—$SO_3H$);

each of m1 and m2 is 1;

q1 is the number of repeating units and is an integer of 3-20; and n represents the number of repeating units.

3. The polyarylene ether-based polymer for an electrolyte membrane of a fuel cell according to claim 2, wherein each of $X^1$ and $X^2$ represents an oxygen atom;

$Y^1$ represents a sulfonyl group (—$SO_2$—);

$R^1$ to $R^8$ are the same or different from one another, and each independently represents a hydrogen atom, methyl group or a sulfonic acid group (—$SO_3H$), with the proviso that three or more sulfonic acid groups (—$SO_3H$) cannot be present;

each of m1 and m2 is 1;

q1 is the number of repeating units and is an integer of 4-10; and n represents the number of repeating units.

4. The polyarylene ether-based polymer for an electrolyte membrane of a fuel cell according to claim 3, wherein the polyarylene ether-based polymer represented by Chemical Formula 1 is represented by the following Chemical Formula 2:

[Chemical Formula 2]

wherein each of x and (100−x) represents a ratio of repeating units based on a total number of repeating units taken as 100; and x represents an integer of 20-40.

5. The polyarylene ether-based polymer for an electrolyte membrane of a fuel cell according to claim 1, wherein the polyarylene ether-based polymer represented by Chemical Formula 1 has a number average molecular weight ($M_n$) of 10,000-200,000 g/mol.

6. The polyarylene ether-based polymer for an electrolyte membrane of a fuel cell according to claim 1, wherein the polyarylene ether-based polymer represented by Chemical Formula 1 has units in which at least one selected from $R^1$ to $R^8$ represents a sulfonic acid group at a ratio of 20-50% based on a total number (n) of units.

7. The polyarylene ether-based polymer for an electrolyte membrane of a fuel cell according to claim 1, which shows peaks at 1.35-1.57, 1.57-1.88 and 3.87-4.08 ppm due to an aliphatic chain as analyzed by $^1$H-NMR.

8. The polyarylene ether-based polymer for an electrolyte membrane of a fuel cell according to claim 1, wherein the polyarylene ether-based polymer represented by Chemical Formula 1 has a glass transition temperature ($T_g$) of 70-130° C.

9. An electrolyte membrane for a fuel cell, comprising the polyarylene ether-based polymer as defined in claim 1.

10. A membrane-electrode assembly for a fuel cell, comprising the electrolyte membrane for a fuel cell as defined in claim 9.

11. The membrane-electrode assembly according to claim 10, which comprises catalyst layers bound to a top and bottom of the electrolyte membrane.

12. A polymer electrolyte fuel cell comprising the membrane-electrode assembly as defined in claim 10.

* * * * *